United States Patent
Jones et al.

(10) Patent No.: US 10,501,182 B2
(45) Date of Patent: *Dec. 10, 2019

(54) PORTABLE UNMANNED DELIVERY AIRCRAFT LAUNCH SYSTEMS, AND METHODS OF DELIVERING PRODUCTS UTILIZING AIRCRAFT LAUNCH SYSTEMS

(71) Applicant: Walmart Apollo, LLC, Bentonville, AR (US)

(72) Inventors: Nathan G. Jones, Bentonville, AR (US); Gregory A. Hicks, Rogers, AR (US); Donald R. High, Noel, MO (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/192,350

(22) Filed: Nov. 15, 2018

(65) Prior Publication Data

US 2019/0084674 A1    Mar. 21, 2019

Related U.S. Application Data

(63) Continuation of application No. 15/271,763, filed on Sep. 21, 2016, now Pat. No. 10,173,774.

(Continued)

(51) Int. Cl.
*B64C 39/02* (2006.01)
*B64C 37/02* (2006.01)

(52) U.S. Cl.
CPC ............ *B64C 39/024* (2013.01); *B64C 37/02* (2013.01); *B64C 2201/027* (2013.01); *B64C 2201/108* (2013.01); *B64C 2201/128* (2013.01)

(58) Field of Classification Search
CPC ........ B64C 2201/128; B64C 2201/088; B64C 2201/066; B64C 2201/187
See application file for complete search history.

(56) References Cited

U.S. PATENT DOCUMENTS

| 1,002,860 A | 9/1911 | Morley |
| 8,511,606 B1 | 8/2013 | Lutke |
| (Continued) | | |

FOREIGN PATENT DOCUMENTS

| CN | 202271897 U | 6/2012 |
| WO | 2015026018 | 2/2015 |
| WO | 2015108588 | 7/2015 |

OTHER PUBLICATIONS

Coxworth, Ben; "HorseFly delivery drone would use a van as its base-on-the-go"; New Atlas; http://newatlas.com/horsefly-uav-delivery-drone/32441/; Jun. 6, 2014; 7 pages.

(Continued)

*Primary Examiner* — Philip J Bonzell
(74) *Attorney, Agent, or Firm* — Fitch, Even, Tabin & Flannery LLP (57) ABSTRACT

In some embodiments, systems, apparatuses and methods are provided to enhance delivery of packages and/or cargo through the use of unmanned delivery aircraft. In some embodiments, a portable unmanned delivery aircraft launch system is provided that comprises: a first portable launch pad system comprising: a package deck; an unmanned delivery aircraft deck secured with the package deck and positioned above and separated by a distance from the package deck; and multiple modular coupling structures fixed with a frame enabling temporary rigid coupling and decoupling between the first launch pad system and multiple additional portable launch pad systems.

20 Claims, 3 Drawing Sheets

Related U.S. Application Data (60) Provisional application No. 62/222,567, filed on Sep. 23, 2015.

(56) References Cited

U.S. PATENT DOCUMENTS

| | | | |
|---|---|---|---|
| 8,899,903 | B1 | 12/2014 | Saad |
| 9,387,928 | B1 | 7/2016 | Gentry |
| 9,550,577 | B1 | 1/2017 | Beckman |
| 9,573,684 | B2 | 2/2017 | Kimichi |
| 9,758,301 | B2 | 9/2017 | Porat |
| 9,777,502 | B2 | 10/2017 | Curlander |
| 9,783,075 | B2 | 10/2017 | Henry |
| 9,815,633 | B1 | 11/2017 | Kisser |
| 9,902,560 | B2 | 2/2018 | Porat |
| 9,915,956 | B2 | 3/2018 | Bokeno |
| 9,969,285 | B2 | 5/2018 | Henry |
| 9,969,495 | B2 | 5/2018 | Gil |
| 1,017,377 | A1 | 1/2019 | Jones |
| 2004/0256519 | A1 | 12/2004 | Ellis |
| 2007/0228214 | A1 | 10/2007 | Horak |
| 2014/0032034 | A1 | 1/2014 | Raptopoulos |
| 2014/0124621 | A1 | 5/2014 | Godzdanker |
| 2014/0129059 | A1 | 5/2014 | Scarlatti |
| 2015/0120094 | A1 | 4/2015 | Kimchi |
| 2015/0175276 | A1 | 6/2015 | Koster |
| 2015/0183528 | A1 | 7/2015 | Walsh |
| 2015/0277440 | A1 | 10/2015 | Kimchi |
| 2016/0196755 | A1 | 7/2016 | Navot |
| 2016/0257401 | A1 | 9/2016 | Buchmueller |
| 2016/0257423 | A1 | 9/2016 | Martin |
| 2017/0032686 | A1 | 2/2017 | Alonso Tabares |
| 2017/0081043 | A1 | 3/2017 | Jones |
| 2017/0110017 | A1 | 4/2017 | Kimchi |
| 2017/0316376 | A1 | 11/2017 | Cooper |
| 2017/0316701 | A1 | 11/2017 | Gil |
| 2017/0320572 | A1 | 11/2017 | High |
| 2018/0134388 | A1 | 5/2018 | Gil |
| 2018/0155027 | A1 | 6/2018 | Gil |
| 2018/0155028 | A1 | 6/2018 | Gil |
| 2018/0155029 | A1 | 6/2018 | Gil |
| 2018/0155030 | A1 | 6/2018 | Gil |
| 2018/0155031 | A1 | 6/2018 | Gil |
| 2018/0155032 | A1 | 6/2018 | Gil |
| 2018/0203465 | A1 | 7/2018 | Suzuki |
| 2018/0222339 | A1 | 8/2018 | Henry |

OTHER PUBLICATIONS

Miler, Patrick C.; "Skysense Charging Pad provides autonomous UAS operations"; UAS Magazine; http://www.uasmagazine.com/articles/847/skysense-charging-pad-provides-autonomous-uas-operations; Nov. 6, 2014; 2 pages.

PCT; App. No. PCT/US2016/052809; International Search Report and Written Opinion dated Dec. 16, 2016.

Schroeter, Ken; "Homemade Helipads"; http://pretorian435.blogspot.com/2010/11/homemade-helipads.html; Nov. 2, 2010; pp. 1.

USPTO; U.S. Appl. No. 15/271,763; Notice of Allowance dated Sep. 4, 2018.

PORTABLE UNMANNED DELIVERY AIRCRAFT LAUNCH SYSTEMS, AND METHODS OF DELIVERING PRODUCTS UTILIZING AIRCRAFT LAUNCH SYSTEMS

CROSS-REFERENCE TO RELATED APPLICATION

This application is a continuation of U.S. application Ser. No. 15/271,763, filed Sep. 21, 2016, which claims the benefit of U.S. Provisional Application No. 62/222,567, filed Sep. 23, 2015, which is incorporated herein by reference in its entirety.

TECHNICAL FIELD

This invention relates generally to product deliveries using unmanned delivery aircraft.

BACKGROUND

In a modern retail environment, there is a need to improve the customer service and/or convenience for the customer. One aspect of customer service is the delivery of products. There are numerous ways to delivery products to customers. Getting the product to a delivery location, however, can cause undesirable delays, can add cost and reduce revenue.

BRIEF DESCRIPTION OF THE DRAWINGS

Disclosed herein are embodiments of systems, apparatuses and methods pertaining portable launch pad systems that include a package deck and an unmanned delivery aircraft deck secured with the package deck and that allows packages to be cooperated with delivery aircraft while the delivery aircraft is positioned on the aircraft deck. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, apparatuses and methods are provided herein useful to cooperate an unmanned delivery aircraft with a package for delivery to a customer in such a way that the aircraft and package can be readily transported to a vehicle that can transport the cooperated aircraft and package to a location proximate a delivery site and deploy the unmanned delivery aircraft to deliver the package. Some embodiments provide an unmanned aircraft launch system that is mobile and modular to enable the distribution of unmanned delivery aircraft.

In some embodiments, a portable launch pad system is provided that includes a package deck and an unmanned delivery aircraft deck secured with the package deck. Typically, the package deck is positioned above and separated by a distance from the package deck. The portable launch pad system can further include multiple modular coupling structures fixed with a frame enabling temporary rigid coupling and decoupling between of the launch pad system with one or more additional portable launch pad systems.

Figure 1:
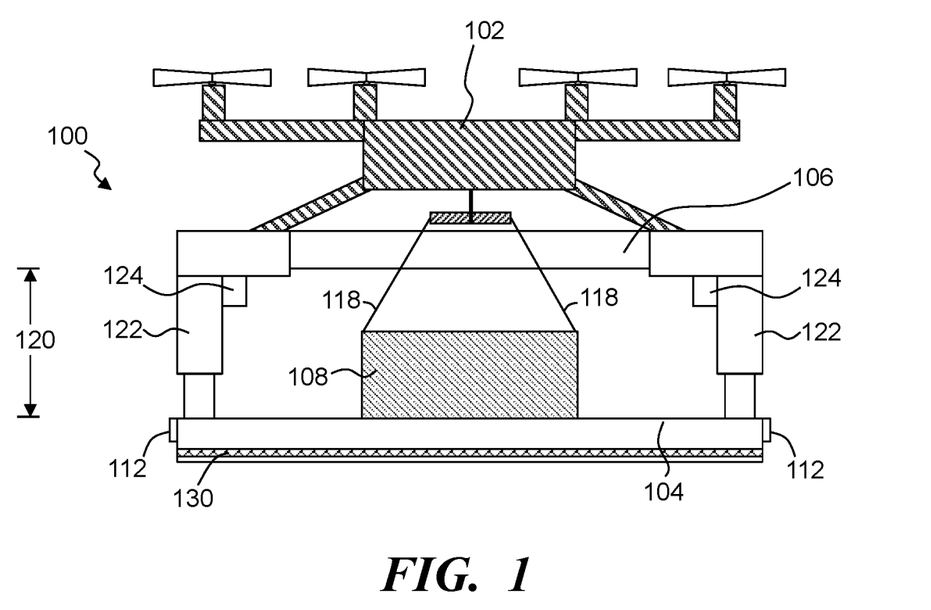
FIG. 1 illustrates a simplified plane view of an exemplary portable launch pad system, in accordance with some embodiments, with an unmanned delivery aircraft resting on the launch pad system.
Figure 2:
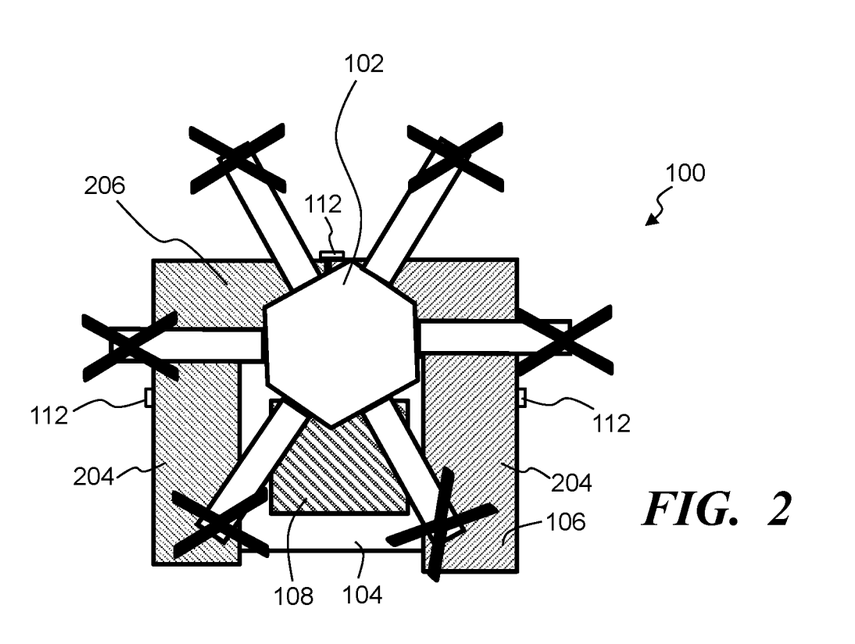
FIG. 2 illustrates a simplified overhead view of an exemplary portable launch pad system similar to that of FIG. 1, in accordance with some embodiments.

FIG. 1 illustrates a simplified plane view of an exemplary portable launch pad system 100, in accordance with some embodiments, with an unmanned delivery aircraft 102 resting on the launch pad system. FIG. 2 illustrates a simplified overhead view of an exemplary portable launch pad system 100 similar to that of FIG. 1, in accordance with some embodiments. Referring to FIGS. 1 and 2, in some embodiments the portable launch pad system 100 includes a cargo or package deck 104 and an unmanned delivery aircraft deck 106. In some implementations, the aircraft deck 106 is secured with the package deck 104 and positioned above and separated by a distance from the package deck. Further, in some embodiments, the portable launch pad system includes multiple modular coupling structures 112 fixed with a frame, the package deck 104, the aircraft deck 106, other structure of the launch pad system, or fixed with two or more of these structural components. The modular coupling structures allow multiple portable launching pad systems to be modularly cooperated together to provide a cooperative launching system with multiple unmanned delivery aircraft.

The package deck 104 is configured to receive one or more cargo or packages 108 intended to be cooperated with a delivery aircraft. The delivery aircraft 102 is positioned on and supported by the aircraft deck 106. Further, in some embodiments, the aircraft deck is configured with an opening providing a pathway between the delivery aircraft 102 and the package 108 when positioned on the package deck. In some implementations, the aircraft deck has generally a U-shape having an opening along one edge 110. The U-shape can be defined by two extension arms 204 that each extends from a frame pad 206 and are separated by a distance along the frame pad defining the opening. Again, the opening provides an opening between the aircraft deck and the package deck. Additionally, the extension arms 204 are typically configured to support at least a portion of the unmanned delivery aircraft 102 that extends across the opening and/or has landing gear that can rest on one or more of the extension arms 204, and frame pad 206.

The opening provided by the U-shaped design allows a package to be cooperated with one or more cords 118, cables, rods, or other structure in order to secure the package with the delivery aircraft 102. The open design further simplifies the process of hooking the package with the delivery aircraft. In some configurations, the delivery aircraft is supported above the package deck and the package can be placed under the delivery aircraft with easy access between the package and the delivery aircraft. As such, workers and/or automated systems can cooperate the package with the delivery aircraft while the package and the delivery aircraft are on the launch pad system. As described below, the cooperation of the package, in some implementations, is through a quick release package hanger that readily releases the package in response to a reduction in weight of the package.

Further, the open U-shape allows the delivery aircraft to take off and move away from the portable launch pad system 100 without the package or the cord contacting or getting caught on a portion of the portable launch pad system. Still further, in some instances, the U-shaped configuration allows the delivery aircraft to lift slightly then move in direction away from the frame pad and along the opening while the package is moved sideways out of the package area defined between the package deck and the aircraft deck. This can allow packages of widths greater than the opening to be supported by and delivered by a delivery aircraft without require the package be lifted up through the aircraft deck.

In some embodiments, as introduced above, one or both the aircraft deck 106 and/or package deck 104 are movable relative to each other allowing the package area to be increased or decreased depending on a size of the package 108 intended to be delivered by the delivery aircraft. Some embodiments include one or more lift systems that is cooperated with the aircraft deck and/or the package deck. The lift system enables a selection of the distance 120 between the aircraft deck and the package deck. In some instances, the lift system include one or more latches that prevent downward movement of the aircraft deck when the latches are engaged. For example, the frame may include one or more supports 122 having upper and lower portions that allow vertical movement relative to each other to increase or decrease the distance 120. A latch system can be cooperated with one or more of the supports and prevents movement between the supports when a latch is engaged, and allows movement when the latch is released. The movement may be implemented by a user physically moving the aircraft deck (e.g., when the latch is disengaged, or latch may allow free raising with inhibiting lowering without disengaging the latch). In other embodiments, the lift system may include one or more motors 124 (e.g., linear motors) that can move the aircraft deck. The one or more motors may be activated by a user or activated by a control system to achieve the desired separation distance 120. In some instances, the one or more motors inhibit movement between the decks once the desired distance is achieved. Additionally or alternatively, one or more latching systems may be used in cooperation with the motors to help maintain the desired separation distance.

Some implementations may further include a user interface that allows the worker to identify a separation distance and/or identify a package and a system can determine a relevant distance. The motors can then be controlled to implement the intended separation distance. The user interface may be on the launch pad system, removably coupled with the launch pad system or separate from the launch pad system (e.g., wired and/or wireless communication with the launch pad system). In some embodiments, the package and/or dimensions of the package may be identified when a worker is preparing the package for delivery (e.g., placing a product into the packaging). The package may be scanned at this time and dimensions identified and communicated to a relevant launch pad system (e.g., launch pad system is pre-assigned); system selects the launch pad system and notifies the worker of a launch pad system identifier; worker selects the launch pad system and specifies the launch pad system identifier; etc.). Additionally or alternatively, the launch pad system may include a scanner that scans the package and accesses a local database or communicates with a database to identify a separation distance to be used with the scanned package. Accordingly, the separation distance between the aircraft deck and the package deck can automatically be adjusted prior to the package being placed in the launch pad system, and/or a worker can scan the package to determine height and adjust the launch pad system.

Figure 3:
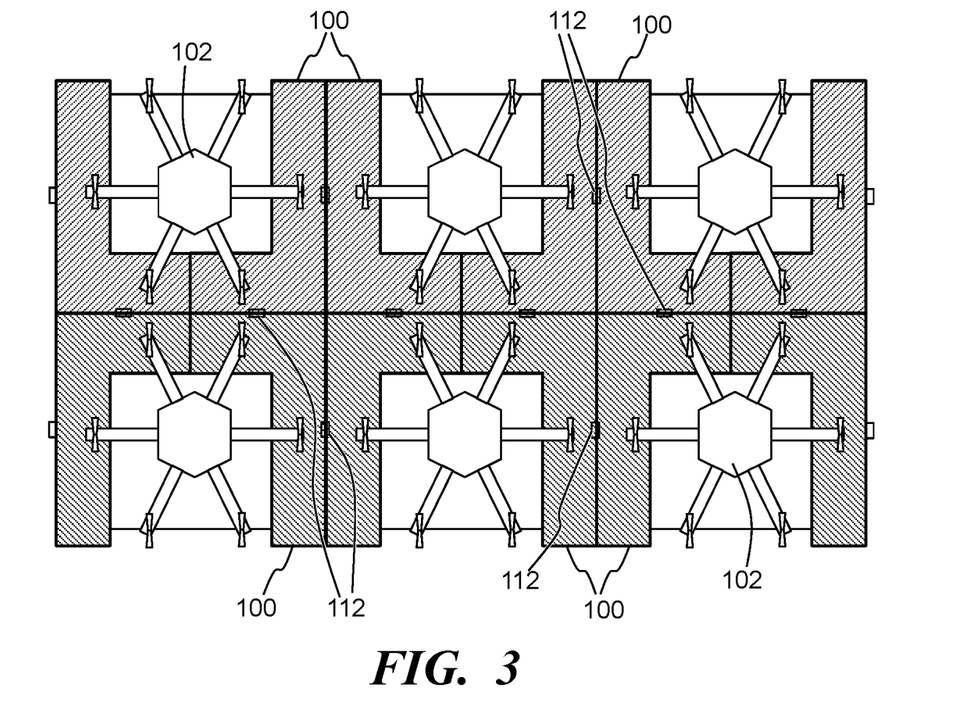
FIG. 3 illustrates an overhead plane view of exemplary portable launch pad systems that have been temporarily coupled together, in accordance with some embodiments.

FIG. 3 illustrates an overhead plane view of exemplary portable launch pad systems 100 that have been temporarily coupled together, in accordance with some embodiments. As introduced above, in some embodiments the portable launch pad system can include one or more modular coupling structures 112 that enable the temporary rigid coupling and decoupling between a launch pad system 100 and one or more additional portable launch pad systems. Accordingly, multiple launch pad systems 100 can be temporarily cooperated together in a modular fashion allowing the collection of launch pad systems to be collectively transported to one or more delivery areas to allow individual unmanned delivery aircraft cooperated with each of the launch pad systems to be deployed to different delivery sites within the one or more delivery areas. In some applications, the cooperated portable launch pad systems can be placed (e.g., by a forklift or other such device) onto and/or into a truck, van or other such delivery vehicle that can transport the launch pad systems to one or more intended delivery areas and allow deployment of one or more unmanned delivery aircraft to fly out from the launch pad systems and delivery corresponding packages to intended delivery locations.

The modular coupling structures 112 can be constructed, in some implementations, to establish a cooperation between two or more launch pad systems that provides a rigid coupling and in some instances allows one launch pad system to support the weight of one or more other launch pad systems and associated unmanned delivery aircrafts and packages. Typically, multiple modular coupling structures 112 are fixed to and distributed about a frame or other structure of the launch pad system. In some instances, at least one modular coupling structure is provided on each of three sides of the modular coupling structure so that at least three modular coupling structures can be coupled with and arranged relative to the frame enabling temporary coupling and decoupling of the launch pad system with at least three additional portable launch pad systems. The modular coupling structures can be substantially any relevant structure, such as tongue and groove, opposing L-shaped brackets, aligned conduits (or apertures) and rods or pins, clamps, latches, other such coupling structures, or a combination of two or more of such structures.

The modular cooperation of the launch pad systems 100 allows multiple coupled launch pad systems to be placed in and/or on a transport vehicle (e.g., a truck). For example, with the cooperation illustrated in FIG. 3, the multiple launch pad systems can be placed with the openings of the U-shaped configurations facing out. This allows the unmanned delivery aircrafts to take off directly from the launch pad systems and away from the transport vehicle without having to be moved from the transport vehicle. The number of launch pad systems that can be cooperated can be substantially any number, and in some instances may be limited by the size of a transport vehicle intended to carry the launch pad systems. Further, with the openings facing out, a driver can readily access the package deck 104 and insert another package (after a first package has been removed by the delivery aircraft) and cooperated with the delivery aircraft. For example, the driver can move around the exterior of the transport vehicle reloading the package decks of the multiple launch pad systems and cooperating the packages with the respective delivery aircrafts upon returning from a delivery.

Figure 4:
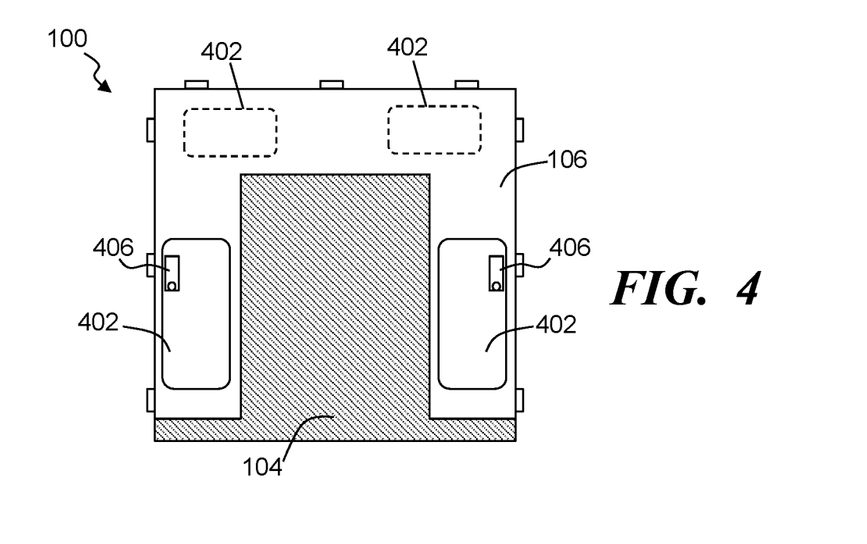
FIG. 4 illustrates a simplified overhead view of an exemplary portable launch pad system with one or more electrical recharging pads of a recharge system that enable the recharging of a battery of the unmanned delivery aircraft, in accordance with some embodiments.

FIG. 4 illustrates a simplified overhead view of an exemplary portable launch pad system 100 with one or more electrical recharging pads 402 of a recharge system that enable the recharging of a battery of the unmanned delivery aircraft 102, in accordance with some embodiments. The orientation and/or number of recharging pads can vary depending on the intended delivery aircraft 102 to be cooperated with the launch pad system. Similarly, the number and/or orientation of the recharging pads 402 can be configured to accommodate multiple different types of aircraft such that the launch pad system can be utilized with multiple different types of delivery aircraft. Further, the orientation may be dependent on providing a positive recharging pad and a negative recharging pad to correspond to the aircraft recharging system (e.g., positive recharging terminal on a left side of the launch pad system, and a negative recharging terminal on a right side of the launch pad system).

The recharging pads are configured to transfer electrical power to the aircraft to allow the aircraft to recharge one or more batteries. The power transfer can be implemented through one or more methods. For example, the power transfer may be provided through inductive coupling, through electrical conductors on the aircraft that physically contact the recharging pads 402, other methods, or combination of two or more of such methods. In some instances, the recharging pads 402 are incorporated into the aircraft deck 106 and electrically coupled with the electrical connector, or a power distribution control circuit on the launch pad system, to receive electrical power from the electrical connector. With this power, the one or more recharging pads 402 are configured to provide electrical power to an unmanned delivery aircraft 102 temporarily resting on the aircraft deck.

In some embodiments, the recharging system may further include one or more electrical connectors that are cooperated with one or more of the multiple modular coupling structures 112. These electrical connectors enable electrical coupling with another portable launch pad systems. As such, electrical power can be transferred through coupled launch pad systems. In some instances, one or more launch pad systems may include a cord or other power input that allows the launch pad system to be coupled to an external power source (e.g., at a distribution center, from a truck or other vehicle, or other source). Similarly, the electrical connectors of a modular coupling structure may cooperate with an external power source that is not part of another launch pad system. The electrical connectors on the coupling structures allow electrical power to be daisy chained or otherwise distributed from one or more launch pad systems to other launch pad systems. Additionally or alternatively, in some implementations one or more launch pad systems may include one or more portable power storage units (e.g., battery, capacitor, etc.) that can store power that can be supplied to the recharging pads 402 and/or distributed to one or more other launch pad systems. The recharge system may include a controller and/or cooperate with a control circuit to control the power distribution and/or power draw to or from one or more other launch pad systems and/or to a delivery aircraft. In some applications, one or more of the modular coupling structures may include one or more communication couplings and/or communication may be established between launch pad systems via the electrical connectors. As such, when a launch pad system is cooperated with another launch pad system through one or more modular coupling structures the communication couplings can couple together providing a communication path and/or network between the launch pad systems. Similarly, the communication connections and/or electrical connectors can couple with one or more external communication networks to allow communication to and from the launch pad system and/or routed through one or more launch pad systems to an intended launch pad system and/or corresponding delivery aircraft. This communication network can allow communication between launch pad systems, between delivery aircraft, external communication and the like. For example, the unmanned delivery aircraft may receive delivery location information, flight route information, programming, and/or other such information through the communication network. This information may be communicated from a transport vehicle carrying the launch pad systems to a delivery area, from a distribution center computer system, or other source. Further, an initial communication may be wired and/or wireless, and the communication network between launch pad systems allows received communications to be distributed through the coupled launch pad systems and the delivery aircraft associated with each launch pad system. For example, the transport vehicle may receive delivery information from a distribution center, and the transport vehicle can communicate the information through the communication network established by the coupled launch pad systems can program the delivery vehicles. Alternatively or additionally, such programming may be partially or fully through wireless communication (e.g., Wi-Fi, Bluetooth, cellular, radio frequency (RF), etc.).

In some implementations, the launch pad system 100 further includes an aircraft securing and/or latching system to secure drone with aircraft deck. The aircraft latching system can, in some applications, be cooperated with the aircraft deck 106 and configured to temporarily secure an unmanned delivery aircraft 102 with the aircraft deck while the aircraft is not active and/or while the portable launch pad system being moved. Because the launch pad system is portable and can be placed on a truck or other vehicle to transport the launch pad systems and delivery aircraft to a desired area, it can be important to secure the delivery aircrafts to the launch pad systems to avoid damage to the aircrafts. In some embodiments, the latching system includes one or more aircraft securing latches 406, motorized and/or pneumatic arms, straps or other such structures or combinations of two or more of such structures to secure the aircraft with the launch pad system. The latches can be manually operated by a user, for example, by rotating and releasing one or more latches over landing gear or other part of the aircraft, and similarly manually unlatched. In other implementations, a motor can be coupled with a latch and controlled by a latch control circuit or other control circuit to automate the latching and unlatching. For example, when the delivery aircraft is signaled to initiate flight and delivery, the latch control circuit can be triggered to activate the latch to unlatch the aircraft. Similar signaling can be communicated to latch the aircraft, such as upon setting the aircraft on the aircraft deck, upon the delivery aircraft returning from a delivery or the like. One or more sensors may detect the presence and/or return of the delivery aircraft (e.g., weight sensor, Infrared, laser, etc.).

As introduced above, in some embodiments the launch pad system 100 includes one or more control systems, circuits or the like. The control system can provide control over one or more components of the launch pad system and/or provide communication from the launch pad system, such as to and/or from the unmanned delivery aircraft 102, with an external inventory system (e.g., inventory system of a product distribution center and/or retailer that is delivering the package 108), a user interface unit (e.g., a user's personal smart phone, a distribution center supplied inventory device, etc.) operated by a user, and the like).

Figure 5:
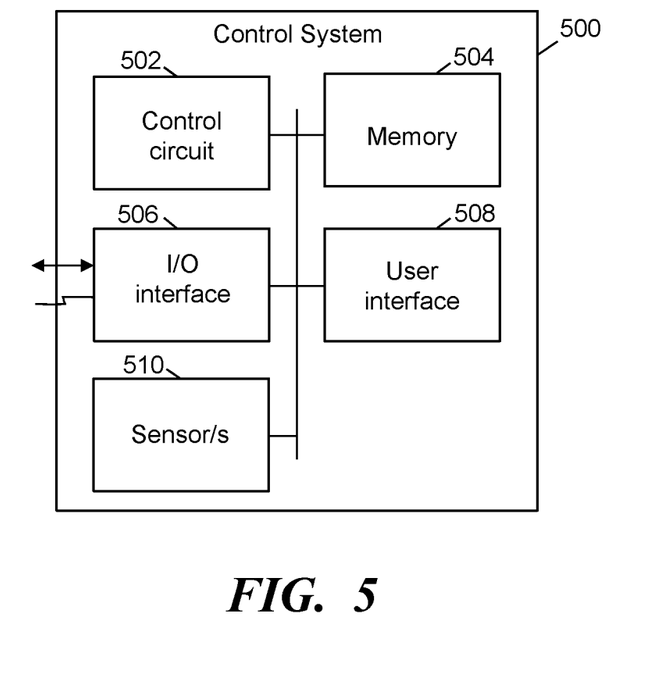
FIG. 5 illustrates a simplified block diagram of an exemplary launch pad control system that is utilized in at least some launch pad systems, in accordance with some embodiments.

FIG. 5 illustrates a simplified block diagram of an exemplary launch pad control system 500 that is utilized in at least some launch pad systems, in accordance with some embodiments. The launch pad control system 500 can perform one or more functions in providing control over the launch pad control system. For example, in some applications the launch pad control system can communicate with the delivery aircraft 102, communicate with another launch pad system in coordinating control, and/or communicate with an external device, such as but not limited to an inventory system, a location system (e.g., to obtain delivery location information to be relayed to a delivery aircraft), a delivery vehicle carrying the launch pad system, user interface units, other such external systems, or combinations thereof.

In this example, the launch pad control system 500 includes a control circuit 502, memory 504, and one or more input/output (I/O) interfaces 506. In some implementations, the launch pad control system includes one or more user interfaces 508 configured to allow users to interact with the launch pad system 100 and launch pad control system 500. The control circuit 502 typically comprises one or more processors and/or microprocessors. The control circuit couples with and/or includes the memory 504. Generally, the memory 504 stores the operational code or one or more sets of instructions that are executed by the control circuit 502 and/or processor to implement the functionality of the launch pad control system. In some implementations, the memory further stores code, instructions and corresponding data to allow the launch pad control system to communicate with the delivery aircraft, control one or more motors, communicate with external devices, store data, control charging, other such operations in controlling the launch pad system, and the like. Such data may be pre-stored in the memory or be received, for example, from an inventory systems, a product ordering system (e.g., operated through a website, an APP on a user interface unit, etc.), point of sale systems, distribution facility system, shopping facility systems, user interface units, other sources, or combinations of such sources.

It is understood that the control circuit may be implemented as one or more processor devices as are well known in the art. Further, the control circuit may utilize remote processors dispersed over a distributed communication network (e.g., LAN, WAN, Internet, etc.). Similarly, the memory 504 may be implemented as one or more memory devices as are well known in the art, such as one or more processor readable and/or computer readable media and can include volatile and/or nonvolatile media, such as RAM, ROM, EEPROM, flash memory and/or other memory technology. Further, the memory 504 is shown as internal to the launch pad control system; however, the memory 504 can be internal, external or a combination of internal and external memory. Additionally, the launch pad control system includes and/or couples with a power supply (not shown) and/or it may receive power from an external source (e.g., through the electrical connectors on the coupling structures 112). In some instances, the control circuit 502 and the memory 504 may be integrated together, such as in a microcontroller, application specification integrated circuit, field programmable gate array or other such device, or may be separate devices coupled together. In some applications, the control circuit 502 comprises a fixed-purpose hard-wired platform or can comprise a partially or wholly programmable platform. These architectural options are well known and understood in the art and require no further description here. The control circuit can be configured (for example, by using corresponding programming as will be well understood by those skilled in the art) to carry out one or more of the steps, actions, and/or functions described herein.

The one or more I/O interfaces 506 allow wired and/or wireless communication coupling of the launch pad control system to external components, such as the delivery aircraft 102, an inventory system, a distribution center system, delivery location systems, one or more databases, user interface units, point of sale systems and other such components. Accordingly, the I/O interface 506 may include any known wired and/or wireless interfacing device, circuit and/or connecting device, such as but not limited to transceivers, receivers, transmitters, and the like. For example, in some implementations, the I/O interface 506 provides wireless communication in accordance with one or more wireless protocols (e.g., cellular, Wi-Fi, Bluetooth, radio frequency (RF), other such wireless communication, or combinations of such communications).

In some embodiments the launch pad control system may include one or more user interfaces 508 in and/or coupled with the launch pad control system, and can include substantially any known input device, such one or more buttons, knobs, selectors, switches, keys, touch input surfaces, scanners, displays, etc. Additionally, the user interface may include one or more output display devices, such as lights, visual indicators, display screens, etc. to convey information to a user, such as delivery location information, status information of the launch pad system 100 and/or the delivery aircraft 102, history information, scheduled product deliveries, customer location information, product information, product identifiers, customer profile information, graphical user interfaces, purchase information, notifications, errors, conditions and/or other such information. While FIG. 5 illustrates the various components being coupled together via a bus, it is understood that the various components may actually be coupled to the control circuit 502 and/or one or more other components directly.

In some embodiments, the launch pad control system 500 includes and/or couples with one or more sensors 510 and/or other such input devices. For example, in some implementations the launch pad system 100 may include one or more scales and/or weight detection devices 130, motion sensors, delivery aircraft detectors, package detectors, distance detectors in detecting a distance between the aircraft deck 106 and the package deck 104, motor indexers, other such sensors, or combination of two or more of such sensors.

As a specific example, in some embodiments the launch pad system includes a scale system with one or more scales and/or weight measurement devices 130. The scale system, in some instances, is cooperated with at least the aircraft deck 106 and typically the package deck 104 and the aircraft deck. Further, the scale system can detect the weight of the package 108, and in some instances detects a weight of a package 108 and an unmanned delivery aircraft 102 positioned on the delivery aircraft deck 106. Accordingly, the scale system can determine a total weight of aircraft and package. This information may be stored by the scale system and/or be reported to the launch pad control system 500, which may store the information. The scale system and/or the launch pad control system may further issue a warning when the total weight of the package exceeds a package weight threshold and/or a combination of the weight of the package and the unmanned delivery aircraft 102 exceeds a combined weight threshold (e.g., based on lift capabilities of the delivery aircraft 102; based on laws and/or regulations; and the like). Further, in some instances, the scale system and/or launch pad control system may store weight records of packages and/or combination weights that can be used to generate reports, and/or the launch pad control system can communicate weight records to external systems and/or databases.

As described above, the launch pad control system 500 can provide control over one or more aspects of the launch pad system 100. In some implementations, the launch pad control system can automatically adjust the distance 120 between the package deck 104 and the aircraft deck 106. For example, the launch pad system 100 may include one or more motors cooperated with the frame, which can include the supports 122, and the control circuit 502 can couple with the one or more motors. The control circuit 502 can receive a separation distance command indicating a distance 120 that should be established between the package deck and the aircraft deck. Based on the separation distance command the control circuit can automatically activate the one or more motors to cause a change in the distance 120 between the package deck 104 and the aircraft deck 106 in accordance with the separation distance command. Feedback information, such as index information, distance measurements from a sensor and/or other such information can be provided to the control circuit to be used in controller the one or more motors to achieve at least the designated distances.

The distance command may be received as a communication from a remote system (e.g., a packaging system as part of preparing the product being delivered), from a databased based on a received package identifier, a distance entered by a user (e.g., through a user interface 508), other such sources, or a combination of such sources. For example, the launch pad system may include a scanner (e.g., a bar code scanner) that can obtain a package identifier that can be used to identify a distance 120 that is to be established, and the control circuit can activate the one or more motors to establish the distance 120. In other implementations, an external scanner may be used and the desired distance communicated to the control circuit.

The control circuit may further communicate with the delivery aircraft 102. Information such as delivery location coordinates, activation commands, overrides, halt commands, and the like can be communicated via wired and/or wireless communication. In some instances, the control circuit can activate the delivery aircraft to secure the package with the aircraft. This can include triggering aircraft to retract the one or more cords 118 to secure package. For example, a user can activate a button or other indicator on the user interface 508 indicating that a package 108 has been cooperated with the delivery aircraft. The control circuit 502 can receive, through the user interface, the secure package command (e.g., in response to the user activating the button on the user interface) in response to preparing the aircraft to take off, or the like. The control circuit can communicate, in response to receiving the secure package command, an activation signal to the unmanned delivery aircraft 102 that is resting on the aircraft deck 106 to cause the delivery aircraft to secure the package with the delivery aircraft. For example, the delivery aircraft may activate a crane system to retract the one or more cord 118 to a threshold. The retraction may force a package release hanger up against the underside of the delivery aircraft or other surface, which can secure tension supports with the package release hanger at least while in transport, and in some instances while in flight. Similarly, the same button or a different button may cause an initial unspooling of the card so that it is easier to cooperate the package with the quick package release system.

Figure 6:
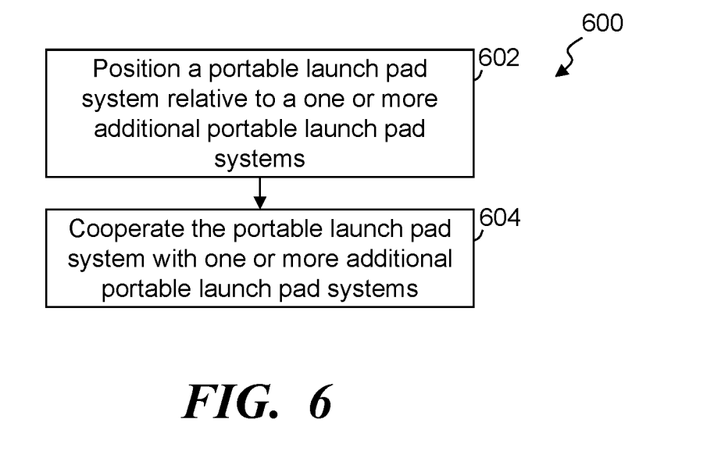
FIG. 6 illustrates a simplified flow diagram of a process of utilizing and/or preparing portable unmanned delivery aircraft launch systems, in accordance with some embodiments.

FIG. 6 illustrates a simplified flow diagram of a process 600 of utilizing and/or preparing portable unmanned delivery aircraft launch systems, in accordance with some embodiments. In step 602, a portable launch pad system 100 is positioned relative to one or more additional portable launch pad systems. Again, each of the portable launch pad systems 100 comprises a package deck 104, an unmanned deliver aircraft deck 106 that is separated by a distance from the package deck, and multiple modular coupling structures 112 fixed with a frame.

In step 604 the portable launch pad system is cooperated with each of the one or more additional portable launch pad systems through the multiple modular coupling structures 112 to temporarily and rigidly couple the launch pad system with the one or more additional portable launch pad systems. As described above, in some implementations, the launch pad system can include multiple modular coupling structures 112 distributed to enable coupling with at least three other launch pad systems. Accordingly, the cooperation of the launch pad system with the additional portable launch pad systems can include cooperating the launch pad system through the multiple modular coupling structures with each of at least three additional portable launch pad systems. Further, in some applications, one or more of the modular coupling structures includes one or more electrical connectors that can electrically couple with an external power source and/or corresponding electrical connectors on one or more other launch pad systems. Additionally, electrical power may be received at the launch pad system 100 through an electrical connector cooperated with one of the multiple modular coupling structures configured to enable electrical coupling with another of the multiple additional portable launch pad systems. The electrical power can further be provided to a delivery aircraft through one or more recharging pads 402 incorporated into the aircraft deck 106 and electrically coupled with the electrical connector while the delivery aircraft temporarily is resting on the aircraft deck.

One or more packages, which are positioned on the package deck 104, can be cooperated with the delivery aircraft 102 through an opening of the aircraft deck with the aircraft deck having a U-shape defining the opening along one edge 110 and between two extension arms 204 each extending from a frame pad 206 and separated by a distance along the frame pad, with the delivery aircraft extending across the opening and being supported by the extension arms and/or the frame pad. The delivery aircraft 102 can temporarily be latched with the aircraft deck 106 while the aircraft is not active and the launch pad system 100 is configured and/or ready to be moved (e.g., moved to a truck or other vehicle, transported by a truck or vehicle, moved to a storage locate, etc.). Further, in some instances, a secure package command is received, for example, through the user interface 508 on the first portable launch pad system. An activation signal can be communicated, for example through a transceiver of the launch pad system and in response to receiving the secure package command, to the delivery aircraft resting on the aircraft deck to cause the delivery aircraft to secure the package with the delivery aircraft.

Further, in some embodiments, the aircraft deck 106 can be movable relative to package deck 104. According, the aircraft deck can be secured at one of multiple different distances 120 from the package deck 104 through a lift system that enables a selection of the distance 120 between the aircraft deck and the package deck. The launch pad system, in some instances may include a control circuit that, at least in part, allows for the automatic adjustment of the distance between the package deck and the aircraft deck. In some instances, a separation distance command can be detected and/or received (e.g., received at the control circuit or an external control circuit). One or more motors can be automatically activated to cause a change in distance 120 between the package deck and the aircraft deck in accordance with the separation distance command. Some embodiments may further detect a weight, through a scale system of the launch pad system 100, of a package and the delivery aircraft positioned on the launch pad system.

In some embodiments, systems, apparatuses and methods are provided to enhance delivery of packages and/or cargo through the use of unmanned delivery aircraft. In some embodiments, a portable unmanned delivery aircraft launch system is provided that comprises: a first portable launch pad system comprising: a package deck; an unmanned delivery aircraft deck secured with the package deck and positioned above and separated by a distance from the package deck; and multiple modular coupling structures fixed with a frame enabling temporary rigid coupling and decoupling between the first launch pad system and multiple additional portable launch pad systems.

In some embodiments, a method of preparing portable unmanned delivery aircraft launch systems, comprises: positioning a first portable launch pad system relative to one or more additional portable launch pad systems, wherein each of the first portable launch pad system and the one or more additional portable launch pad systems comprises a package deck, an unmanned deliver aircraft deck separated by a distance from the package deck, and multiple modular coupling structures fixed with a frame; and cooperating the first portable launch pad system with each of the one or more additional portable launch pad systems through the multiple modular coupling structures to temporarily and rigidly couple the first launch pad system with the one or more additional portable launch pad systems.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A portable unmanned delivery aircraft launch system, comprising:
   a first portable launch pad system comprising:
     a first deck;
     an unmanned delivery aircraft deck configured to support an unmanned delivery aircraft, wherein the aircraft deck is secured relative to the first deck; and
     one or more modular coupling structures each fixed with at least one of the aircraft deck and the first deck, wherein the one or more modular coupling structures enable temporary rigid coupling and decoupling between the first portable launch pad system and one or more additional portable launch pad systems at least temporarily cooperating together the first portable launch pad system and the one or more additional portable launch pad systems in a modular fashion.

2. The portable unmanned delivery aircraft launch system of claim 1, wherein the one or more modular coupling structures comprise at least three modular coupling structures coupled with and arranged relative to the at least one of the aircraft deck and the first deck enabling temporary coupling and decoupling of the first portable launch pad system with at least three of the one or more additional portable launch pad systems.

3. The portable unmanned delivery aircraft launch system of claim 1, wherein the first portable launch pad system further comprises:
   a recharging system comprising:
     an electrical connector cooperated with one of the one or more modular coupling structures configured to enable electrical coupling with another of the one or more additional portable launch pad systems.

4. The portable unmanned delivery aircraft launch system of claim 1, wherein the first portable launch pad system further comprises:
   a user interface;
   a communications transceiver configured to communicate with one or more devices separate from the first portable launch pad system;
   a control circuit; and
   a memory coupled to the control circuit and storing computer instructions that when executed by the control circuit cause the control circuit to perform the steps of:
     receive, through the user interface, a secure package command; and
     communicate, in response to receiving the secure package command, an activation signal to an unmanned delivery aircraft resting on the aircraft deck to cause the unmanned delivery aircraft to secure a package with the unmanned delivery aircraft.

5. The portable unmanned delivery aircraft launch system of claim 1, wherein the aircraft deck has a U-shape.

6. The portable unmanned delivery aircraft launch system of claim 5, wherein the U shaped aircraft deck exposes the first deck to an unmanned delivery aircraft when supported by the aircraft deck.

7. The portable unmanned delivery aircraft launch system of claim 5, wherein the U shaped aircraft deck comprises an opening defined by two extension arms each extending from a frame pad and separated by a distance along the frame pad, wherein the opening provides an opening between the aircraft deck and the first deck and the extension arms are configured to support an unmanned delivery aircraft extending across the opening.

8. The portable unmanned delivery aircraft launch system of claim 7, wherein the opening is configured to enable the unmanned delivery aircraft to launch from and move away from the aircraft deck in a direction away from the frame pad and along the opening while a package is moved out of a package area defined between the package deck and the aircraft deck.

9. The portable unmanned delivery aircraft launch system of claim 1, further comprising a lift system cooperated with the aircraft deck and configured to adjust a distance between the aircraft deck and the first deck.

10. The portable unmanned delivery aircraft launch system of claim 9, wherein the lift system comprises:
a control circuit configured to obtain a dimension of a package and activate the lift system to cause a change in distance between the first deck and the aircraft deck in accordance with the dimension of the package.

11. A method of preparing portable unmanned delivery aircraft launch systems, comprising:
positioning a first portable launch pad system relative to one or more additional portable launch pad systems, wherein the first portable launch pad system comprises a first deck, an unmanned delivery aircraft deck configured to support an unmanned delivery aircraft, and one or more modular coupling structures each fixed with at least one of the aircraft deck and the first deck; and
cooperating the first portable launch pad system with at least one of the one or more additional portable launch pad systems through at least one of the one or more modular coupling structures to temporarily and rigidly couple the first portable launch pad system with the at least one of the one or more additional portable launch pad systems.

12. The method of claim 11, further comprising:
receiving, through a user interface of the first portable launch pad system, a secure package command; and
communicating an activation signal to an unmanned delivery aircraft resting on the aircraft deck of the first portable launch pad system to cause the unmanned delivery aircraft to secure a package with the unmanned delivery aircraft.

13. The method of claim 11, wherein further comprising:
obtaining, through a control circuit of the first portable launch pad system, a dimension of a package; and
controlling, through the control circuit, a lift system of the first portable launch pad system to cause a change in distance between the first deck and the aircraft deck in accordance with the dimension of the package.

14. The method of claim 11, wherein the cooperating the first portable launch pad system with the at least one of the one or more additional portable launch pad systems comprises cooperating the first portable launch pad system through the one or more modular coupling structures with each of at least three additional portable launch pad systems.

15. The method of claim 14, further comprising:
receiving electrical power at the first portable launch pad system and transferring the electrical power to the at least one of the one or more additional portable launch pad systems through an electrical connector cooperated with a first modular coupling structure of the one or more modular coupling structures.

16. The method of claim 11, further comprising:
cooperating a package, which is positioned on the first deck, with an unmanned delivery aircraft through an opening of the aircraft deck.

17. The method of claim 16, wherein the cooperating the package comprises cooperating the package through the opening in the aircraft deck comprising a U-shape defining the opening along one edge and between two extension arms each extending from a frame pad and separated by a distance along the frame pad, with the unmanned delivery aircraft extending across the opening and being supported by the extension arms.

18. The method of claim 17, launching the unmanned delivery aircraft to lift from and move away from the aircraft deck in a direction away from the frame pad and along the opening while the package is moved out of a package area defined between the package deck and the aircraft deck.

19. The method of claim 11, further comprising:
securing the aircraft deck at one of multiple different distances from the first deck through a lift system.

20. The method of claim 19, further comprising:
receiving a separation distance command; and
activating one or more motors of the lift system to cause a change in distance between the first deck and the aircraft deck.

* * * * *